No. 811,722. PATENTED FEB. 6, 1906.
P. J. HOENSCHEID.
DRILL CHUCK.
APPLICATION FILED MAR. 7, 1904.

WITNESSES
Geo. W. Graves
Jas. P. Barry

INVENTOR
PETER J. HOENSCHEID
BY James Whittemore
ATT'Y.

UNITED STATES PATENT OFFICE.

PETER J. HOENSCHEID, OF DETROIT, MICHIGAN, ASSIGNOR TO NATIONAL TWIST DRILL & TOOL COMPANY, OF DETROIT, MICHIGAN, A CORPORATION OF MICHIGAN.

DRILL-CHUCK.

No. 811,722.　　　　Specification of Letters Patent.　　　　Patented Feb. 6, 1906.

Application filed March 7, 1904. Serial No. 197,061.

*To all whom it may concern:*

Be it known that I, PETER J. HOENSCHEID, a citizen of the United States, residing at Detroit, in the county of Wayne and State of Michigan, have invented certain new and useful Improvements in Drill-Chucks, of which the following is a specification, reference being had therein to the accompanying drawings.

The invention relates to an improved chuck for tools of various kinds; and it consists particularly in such a chuck comprising a shank, a slitted cylindrical head, and a clamping-sleeve; also, in the combination, with such a chuck, of a reducing-bushing adapted to be clamped upon the tool by the clamping device of the main chuck, and in the construction, arrangement, and combination of the various parts, all as more fully hereinafter described, and particularly pointed out in the claims.

Figure 4:
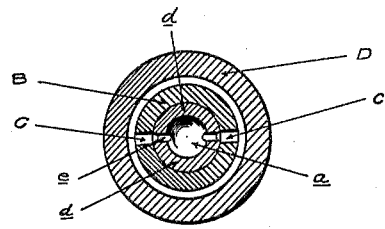
Figure 1:
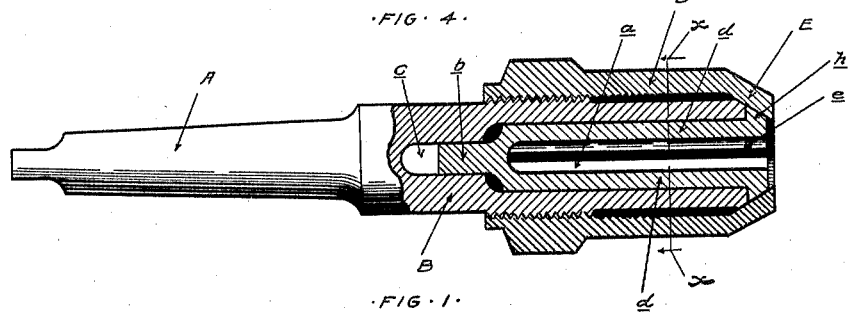
Figure 2:
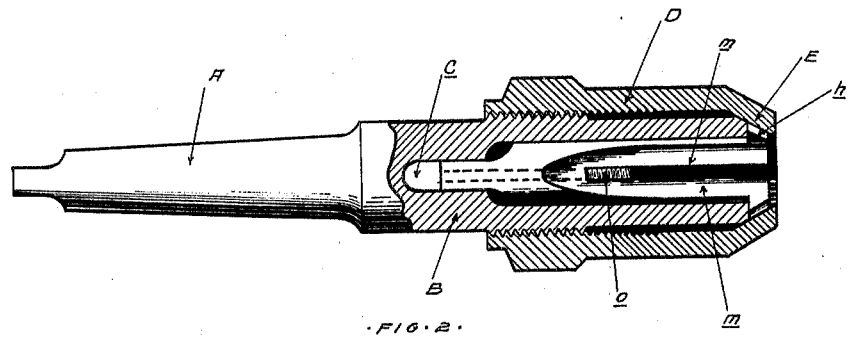
Figure 3:
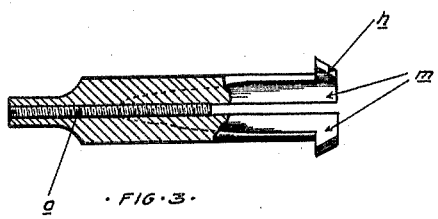
Figure 5:
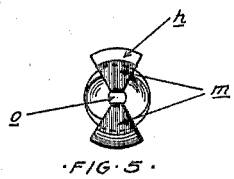

In the drawings, Figure 1 is a vertical central longitudinal section through my improved chuck, showing the reducing-bushing in position. Fig. 2 is a similar section of a modified form of bushing, the bushing being shown in elevation. Fig. 3 is a vertical longitudinal section through the bushing shown in Fig. 2. Fig. 4 is a section on line $x\ x$, Fig. 1. Fig. 5 is an end elevation of Fig. 3, showing the tapering jaws.

A represents the shank of the main chuck; B the head, which is cylindrical in shape and has the slits C therein forming two separated members, which may be moved toward each other to act for a clamp for the shank of an inserted tool. The means I prefer to effect this clamping is the sleeve D, having a screw-threaded engagement with the exterior of the head and having the inclined or tapering flange E at its outer end engaging inclined bearings at the outside of the forward end of the head. With this construction it is obvious that if a tool-shank is fitted into the opening in the head and the sleeve D screwed inward the inclined bearing on the sleeve acting on the incline on the head it will cause the two members of the head to contract and tightly clamp the tool in the chuck.

In order to clamp tools of lesser diameter in the chuck, I may place a reducing-bushing within the head of the main chuck, and this reducing-bushing I may make as shown in Fig. 1, where it is shown as comprising a shank $a$, preferably having a tang $b$ adapted to engage the slot $c$ in the outer end of the shank of the main chuck, and a cylindrical head $d$, having slits $e$ complementary to the slits in the head of the main chuck. At the outer end of this bushing is an annular flange $h$, having its outer face inclined complementarily with the inclined bearings F on the head of the main chuck. To put this bushing in, the sleeve D is removed and then reëngaged with the head, and in screwing the sleeve inwardly the inclined flange on the sleeve will engage the inclines on the heads of the main chuck and the bushing and contract those heads, so as to tightly clamp the shank of an inserted tool in position. I find that this is so effective as a clamp that it will hold a tool tightly in position even if its tang $b$ is broken off and without requiring any work or machinery of the shank.

Instead of the cylindrical bushing shown in Fig. 1 I may insert the bushing shown in Figs. 2 and 3, which has the usual shank and tang; but instead of having cylindrical jaws or head it has the tapering jaws $m$, adapted to fit the grooves in the side of what is known as the "Graham twist-drill." This bushing has the same flange $h$, with the inclined bearing, as described, for the bushing shown in Fig. 1. In such a bushing as is shown in Fig. 3 it is desirable to have a stop for the end of the tool, and this I form by forming an aperture through the shank and tang leading into the space between the jaws and screw-thread this aperture and place therein the screw $o$, Fig. 3, the head of the screw being preferably flush with the face of the tang, so that blows thereon to loosen the bushing will not injure the screw-head, the inner end of the screw projecting slightly between the jaws to act as a stop for the tool.

What I claim as my invention is—

1. In a drill-chuck, the combination with a shank member having a longitudinal split and chambered cylindrical head portion formed with an inclined outer edge, a bushing member having a longitudinal slit therein and a tapered head, and a sleeve having a threaded engagement with the head and formed with a tapered outer end portion adapted to simultaneously engage the respective tapered ends of the shank and bushing.

2. In a drill-chuck, the combination with an expansible chambered head, of a compression-sleeve having a threaded engagement with the head, and a tapered end portion engaging the forward edge of the head, and a bushing within the head provided with a tapered portion at its forward edge adapted to engage the tapered parts of the sleeve.

3. The combination of a main chuck consisting of a shank, longitudinally-slitted head and an exterior sleeve having a screw-threaded engagement with the head for contracting the members of the head, of a split reducing-bushing adapted to fit the head, a bearing on the bushing adapted to be engaged by said sleeve, whereby the sleeve on the outside of the main chuck will contract and directly compress the jaws of the bushing when the sleeve is moved rearward.

In testimony whereof I affix my signature in presence of two witnesses.

PETER J. HOENSCHEID.

Witnesses:
JAMES WHITTEMORE,
JAMES P. BARRY.